May 5, 1936.   C. H. HOWLAND-SHEARMAN   2,039,840
METHOD FOR CAUSING COLD FLOW IN SUBSTANCES
Filed Dec. 14, 1933   6 Sheets-Sheet 1

INVENTOR
Charles H. Howland-Shearman
BY
ATTORNEY

Fig.5
Punched

Fig.5a
Flowed   Punched

Fig.5b
Drilled

Fig.5c
Flowed

Fig.6

May 5, 1936.　　C. H. HOWLAND-SHEARMAN　　2,039,840
METHOD FOR CAUSING COLD FLOW IN SUBSTANCES
Filed Dec. 14, 1933　　6 Sheets-Sheet 4

INVENTOR
Charles H. Howland-Shearman.
BY
ATTORNEY

May 5, 1936.    C. H. HOWLAND-SHEARMAN    2,039,840
METHOD FOR CAUSING COLD FLOW IN SUBSTANCES
Filed Dec. 14, 1933    6 Sheets-Sheet 6

INVENTOR
Charles H. Howland-Shearman
BY
ATTORNEY

Patented May 5, 1936

2,039,840

UNITED STATES PATENT OFFICE 2,039,840

METHOD FOR CAUSING COLD FLOW IN SUBSTANCES

Charles H. Howland-Shearman, Hamden, Conn.

Application December 14, 1933, Serial No. 702,286

23 Claims. (Cl. 164—125)

This invention relates to improvements in method and apparatus for causing cold flow in substances.

The invention has many new and useful applications particularly in the metal working art, and an object of the invention is to provide a new and useful method of working metals which is less costly than known methods and which produces a new and useful product having many uses in the arts.

Other objects will be apparent from the following specification wherein, by way of illustration, the invention is described in connection with flowing steel. It will be understood, however, that steel is referred to merely by way of illustration as the invention applies to all substances having a suitable crystalline structure. By "suitable crystalline structure" is meant any structure in which cold flow (as herein defined and claimed) occurs.

Crystalline structures may be generally classified for the purposes of this specification in four groups, hereinafter referred to and may be distinguished by the usual tests employed in crystallography.

Brief reference will first be made to the characters of crystals in general, in order that the discovery may be clearly understood.

"A crystal is the regular polyhedral form, bounded by smooth surfaces, which is assumed by a chemical compound, under the action of its intermolecular forces, when passing, under suitable conditions, from the state of a liquid or gas to that of a solid." (Dana.)

As expressed in the foregoing definition, a crystal is characterized first by its definite internal molecular structure and secondly by its external form. Some species occur not in distinct crystals but in massive form, and in some exceptional cases the definite molecular structure appears to be absent.

By definite molecular structure is meant the special arrangement which the physical units, called molecules, assume under the action of the forces exerted between them during the formation of the solid. The definite molecular structure is the essential character of a crystal and the external form is only one of the ways although the most important in which this structure is manifested. Thus, it is found that all similar directions in a crystal, or a fragment of a crystal, have like physical characters, as of elasticity, cohesion, action on light, etc. It is evident, therefore, that a small crystal differs from a large one only in size and that a fragment of a crystal is itself essentially a crystal in all its physical relations, although showing no crystalline faces.

It is believed that all solid bodies are made up of definite physical units, called the physical, or crystal, molecules. Of the form of the molecules, nothing is definitely known, and though theory has something to say about their size, it is enough here to understand that they are almost infinitely small, so small that the surface of a solid—e. g. of a crystal—may appear to the touch and the eye even when assisted by a powerful microscope, as perfectly smooth. The molecules are further believed to be not in contact but separated from one another—if in contact, it would be impossible to explain the motion to which the sensible heat of the body is due, or the transmission of radiant heat and light through the mass by the wave motion of the ether, which is believed to penetrate the body.

When a body passes from the state of a liquid or gas to that of a solid, under such conditions as to allow perfectly free action of the forces acting between the molecules, the result is a crystal of some definite type as regards symmetry. The simplest hypothesis which can be made assumes that the form of the crystal is determined by the way in which the molecules group themselves together in a position of equilibrium under the action of the intermolecular forces.

Solids may be roughly classified in four groups:

(a) Those which in themselves constitute a single crystal individual, or which constitute a crystalline aggregate made up of a multitude of crystal individuals.

(b) Substances which are partly crystalline but contain cementitious amorphous substances.

(c) Those having micro-structures of dissociate crystals aggregated with a non-cementative amorphous material.

(d) Those in which definite molecular structure is wanting, and all directions in the mass are sensibly the same. Such substances are commonly said to be amorphous.

Steel for the purposes of describing the invention herein set forth, may be said to belong to group (b) above and to comprise a crystalline aggregate in which the grain or crystal boundaries contain amorphous cement which bind the grains together. The exact chemical specifications and therefore the crystalline structure of various steels vary widely depending upon the physical characteristics desired. For example, alloy steels may be composed of iron and carbon and contain nickel or manganese, or if quaternary steels, they may consist of iron, carbon and two other elements such as nickel-chromium.

Figure 1:
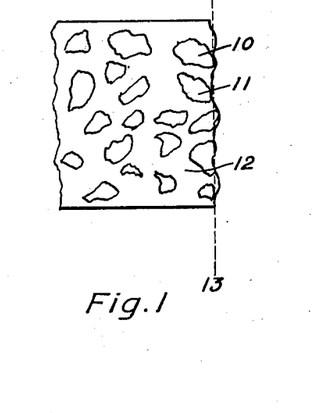
Figure 1 is a diagram showing the structure of a piece of steel in which the crystals forming part of the crystalline aggregate and amorphous material cementing the same are illustrated on a greatly enlarged scale.

Figure 1 is a diagram illustrating (in greatly enlarged form and without attempting to show the relative size and placement of the crystals) the structure of a piece of steel in which two of the crystals forming part of the crystalline aggregate are indicated by the numerals 10 and 11, and the amorphous cement by the numeral 12. When such a piece of steel is worked by sawing, punching, cutting, hobbing and the like, while cold, the crystalline aggregates and amorphous cement are severed at the line of work, as indicated by the line 13 and the crystalline structure of the steel is torn apart by the tool. Whatever displacement of the crystalline aggregate takes place in the amorphous material is entirely incidental and haphazard and with the large majority of such operations performed on steel, no such displacement does take place except perhaps in the case of a few individual crystals, which may be deformed and accidentally driven into the amorphous material. Usually the crystals are torn out of the amorphous material instead of being driven therein. The result is that where a highly finished surface is desired along the line of cut, the surface must be finished after the preliminary sawing, milling or hobbing operation. This is usually accomplished by grinding or the like, and here, again, no displacement of the crystals takes place, the rough surfaces being merely smoothed up by removing the high spots therefrom. If a very accurate surface is desired, it is given a final lapping. But here again, if ground or lapped the surface is only as smooth as the tool and process will make it, and no definite rearrangement of the crystalline and amorphous surface is obtained or purposely attempted.

In connection with operations such as cold rolling, swaging and the like, the relative position of the crystalline and amorphous material may be changed, the crystalline material being compacted and distorted by the rolling or blows so that the natural grain of the material and consequently the natural crystalline formation thereof is changed but here again while none of the material is forcibly removed as referred to in the preceding paragraph, no definite rearrangement of the crystalline structure takes place along a given path or direction, and whatever rearrangement does take place is entirely haphazard and not purposely intended. For example, in forming a piece of steel by extruding, it may be assumed that the crystals in the steel are rearranged and that this rearrangement to a greater or lesser extent takes place through the entire piece of steel being worked. But if there is any surface change, there is no definite line of demarcation between that surface portion in which the crystalline structure is rearranged and that portion below the surface which is left more or less in its original form. This applies equally as well to swaging, for example when a bicycle spoke head is formed by swaging, the metal in the body of the spoke is left in another condition. In both cases the change is one that takes place in an indefinite manner so far as crystalline rearrangement is concerned, and no change along a definite path of crystalline or molecular cleavage is purposely attempted or occurs.

Another known method of treating steel includes a large number of operations in which the steel is heated, thereby bringing about a relative disassociation, more or less, of the crystalline structure before work is performed thereon. If the heat is sufficient the actual molecular structure of the crystalline constituents of the steel may change. It is not necessary to an understanding of the discovery herein disclosed, to discuss the conditions existing in connection with such hot working of steel, but it may be said that here also, where any rearrangement of the crystalline structure is produced, no clear line of demarcation is found between that portion of the steel in which the crystals are rearranged by a given operation, and that in which the crystals are left in their original positions and no change along a definite path of crystalline or molecular cleavage is purposely attempted or occurs.

From the foregoing résumé of the prior art, it will be observed that there is no known process of working crystalline substances including steel, which contemplates disassociating the crystals by pressure and causing them to flow and assume a new massive body, the finished surface of which is built up of rearranged crystals. This will be more apparent from a consideration of Figures 6, 7 and 8 relating to the "work area" as hereinafter referred to.

The invention or discovery herein termed "cold flowing" will now be defined as follows:

The demarcation between elasticity or the crystalline coherence of material and plasticity or its crystalline stratified fluidity is a sharp equation line representing a fractional instant of position in any pressure transit, through the crystalline or molecular structure of a substance. In the infinitesimal part of a second required to cross this equation line, the physical positions, relativity and traits of the crystalline bodies in the fluidic area are changed into an entirely new congruity of structure by the force producing this phenomenon, the method and apparatus herein described for causing such change and rearrangement is the discovery or invention claimed herein.

Figure 2:
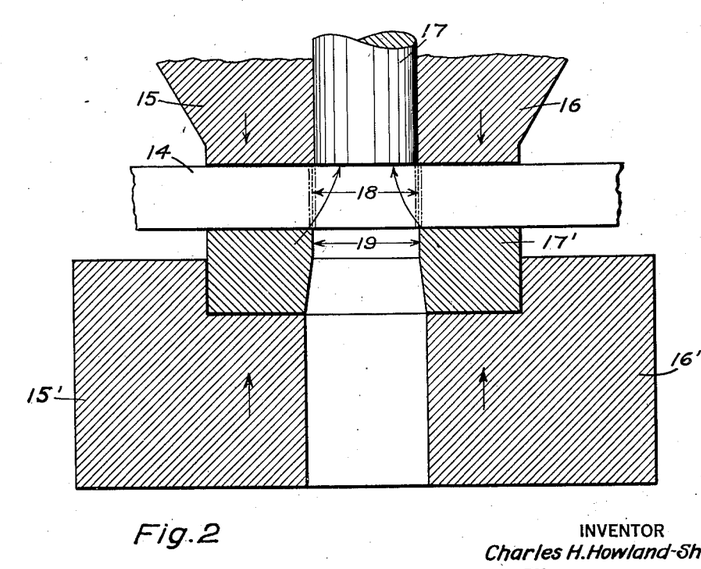
Figure 2 is a diagram of the apparatus necessary to manifest the discovery herein described and which further illustrates the method herein disclosed.

The foregoing will be more clearly understood by reference to Figure 2, wherein, by way of example, is shown a plate 14 of cold rolled steel which may be assumed to be ½" thick, having 75,000 pounds tensile strength and probably .35/.40 carbon in which it is desired to make a ¾" absolutely smooth parallel-sided cylindric hole.

First there is applied to a portion of the plate through which the hole is to be made, a preoperative compression. This is accomplished by clamping the plate between suitable clamp members 15, 15', 16 and 16', 15 and 16 having force supplied downwardly, and 15' and 16' having force supplied upwardly. This defines a zone in the plate surrounding the area in which the work is to be done which area is thus preoperatively submitted to intense pressure for the purpose of holding the crystalline or molecular structure of the material adjacent the area to be worked intact and unaltered during operation. This is hereinafter termed "fracture proofing" for the reasons that the preoperative pressures are very delicately and positively determinate ones, not mere mechanical devices.

Figure 6:
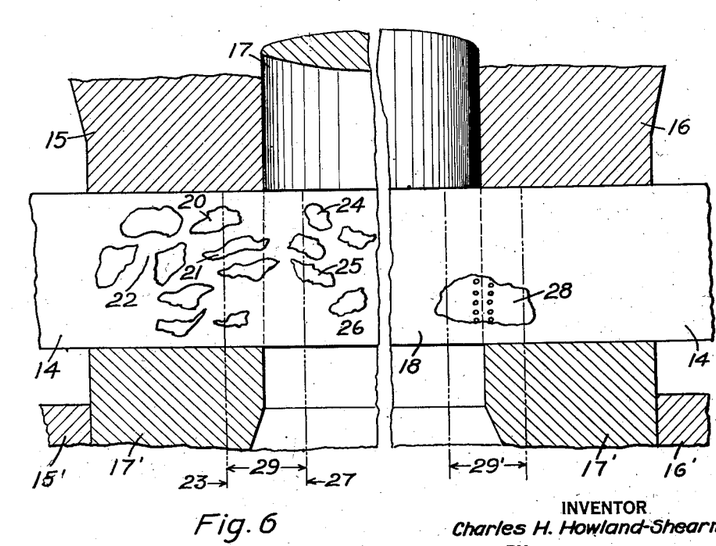
Figure 6 shows a section of the walls of the work or fluidic area set up in a piece of steel at the fractional instant of position of flow therein when the same is being worked in accordance with the method herein disclosed.

An area in plate 14 being under preoperative compression as above described, force is applied to the tool 17 which together with the rest 17', defines a boundary or what is hereafter termed a "work area", resting upon the superficial layer of the blank area 18. This force is simultaneously translated from the superficial layer through all subjacent layers, the material being still held in full elastic state. As the progress of the tool continues, a point is reached where simultaneously the elasticity of all the strata of the substance changes instantly to plasticity, succeeded by several phenomena in the following order:

The crystals of the original coherent structure, the plate 14, in the work area or area of fluidity shown in Figure 6, at the outer periphery of the blank area 18, change their axes of orientation in the direction of the force applied by 17 and, flowing throughout all layers in this fluidic area simultaneously, they pass through the amorphous matter interstitial to the crystalline bodies, (commonly called grains) which matter acts as a flux. The bodies now rearrange themselves fluidically in a clear, smooth plane in the direction of the force, leaving what appears to the eye as a polished surface, but what is in effect a fluidic plane superficially constructed from the crystalline bodies and having the amorphous flux lying between them in minute striations parallel to the force-direction. Here it may be said that nature supplies the finish on the surfaces flowed and the finish of same is not dependent upon mechanical work done thereon. The surfaces that have parted, within the work or fluidic area, have an outer layer or skin formed thereon of compacted crystals and amorphous flux, which skin cannot be formed on pieces of accurate size in any other manner.

With substances like rolled steel, forgings, tool steel, rolled brass, silver, aluminum and the like, all of which have micro-structures of crystals cemented together by amorphous matter, a true crystalline flow as just described occurs, the fused amorphous matter acting as a flux through which the crystals actually flow in the direction of the applied force.

On substances like cast iron and the like, the physical condition is different because such materials have micro-structures of dissociate crystals aggregated within a non-cementive amorphous material such as carbon, silicon, etc. Here the pressure applied produces pure stratified displacement of the dissociate crystals without any fluxing action of the non-cementive amorphous content and hence there is no coherent body in the blank area 18 so that when operating on such materials, the entire area below the tool 17 may be, and often is, reduced to powder, and it is believed such materials cannot be cold forged, drawn, etc. in accordance with this discovery, as can be readily done with those materials of the cemented crystalline group. The methods necessary when forging, drawing, etc. form the subject matter of other applications for patent and are not herein described in detail.

Mention is made here of materials of dissociate crystalline micro-structure in order to clearly distinguish from materials of the cemented crystalline group, but with either group holes or surfaces defined by operations on them as herein described have superficies built up of crystals and are as smooth as said crystals will permit. In the case of dissociate crystalline structure, densification of the superficies apparently takes place along the line of flow in the work area, without the presence of cementitious flux.

It appears that this invention applies to any material containing an element capable of being rendered plastic or flowed under pressure, the material being of sufficient strength to resist fracture under this pressure until the crystalline or molecular structure thereof passes the equation line in the pressure transit, at which point the change herein described takes place.

The discovery or invention is clearly evidenced by its physical effects upon the steel plate 14 in which the hole has been cold flowed as just described, these effects are essentially different from the physical effects accruing from any previous known method of treating such material.

Considering the case of the cold rolled steel above referred to and assuming that a test piece of such steel has been taken 15" in length and that 6" from one end a ¾" hole has been cold flowed as just described, and that 6" from the opposite end a ¾" hole has been drilled with a standard high grade drill under perfect operating conditions, and with a moderate feed, the working time required for the flowed hole is ½ second, and the time required for the drilled hole is 38 seconds.

Upon placing such test piece in a testing machine for a tension test, it will invariably break through the drilled hole, while the flowed hole remains perfectly smooth, solid and without scratches. Sawing across both holes carefully and submitting the interior walls to microscopic examination, it is found that the drilled hole has, entirely around its peripheral surface a series of minute spiral excoriations which have weakened the wall and caused the hole to yield, while the flowed hole will be found to have around its peripheral surface a fine mirror-like perfectly smooth superficies with infinitesimal striations running its length at 90° to the surface of the material. The flowed hole is undistorted although the configuration of the drilled hole has been destroyed by the test.

Assuming that two more test pieces exactly like the first are made, one having its holes carefully drilled and the other having identical holes cold flowed, upon sawing these respective pieces in half, the following physical conditions will be found.

The drilled plate exhibits holes which are filled with perfectly uniform spiralic scratches or excoriations from top to bottom. The microscope reveals that in these excoriations are minute crystalline fragments pulled up out of the structure of the metal. It also shows that while the gap between the spiral channels is approximately regular, representing the feed of the drill, the actual width of the channels themselves varies exceedingly, due to the irregular manner in which the crystals disport themselves while being torn away from their coherent material. Carefully considering the drilled result it is found that the hole would be wholly incapable of acting, for instance, as a journal in which to turn a high speed spindle, but would have to be reamed several times to make it answer such a purpose. These holes could not have been drilled to the required ¾" diameter if it were intended to make that diameter smooth, but must be drilled say $\frac{1}{32}$" less and then reamed to size. It will also be found that the drilled holes are not of absolute uniform top and bottom diameter which reaming is required to correct.

Now taking the plate in which the holes have been cold flowed, it will be found upon sawing it in half and submitting it to the microscope that the holes have a glass-smooth superficies throughout, all upon a single plane, without pits, abrasions or channels of any kind whatsoever. It will be found that the surface has infinitesimal striations running closely parallel at 90° to the surface of the plate, but that the accuracy of the cylindric surface is so great that it would be superior, for instance, to the carefully drilled and reamed hole for use as a bearing. It will also be found that the maximum average difference between the top and bottom diameter of the holes is .0002", being about three times the accuracy of a drilled and reamed hole.

Upon comparing the effects of the drilling process as compared with cold flowing, it will be found that the material of the drilled hole, considered before its correction through reaming, is profoundly disturbed for a depth away from the plane of entry of about .007" thickness, whereas the material of the flowed hole is dense, smoothly and evenly disposed and is but slightly disturbed from the surface back for a distance of at least .004" and not at all disturbed back of that distance.

Upon testing the two holes by Brinell test, it will be found that the wall of the drilled hole shows substantially an identical Brinell hardness to that of the surface of the plate, and that the cold flowed hole shows a Brinell hardness averaging from 10 to 12 points higher than that of the surface of the plate. Therefore, the act of cold flowing increases the density of the superficies of the hole materially and adds to its durable life which accounts in a measure for the fact that in a tension test a flowed hole invariably stands while an identical hole drilled in the same piece disrupts. From this, it may be deduced that the action of any excoriating tool has a tendency to tear out, without compensatory displacement, crystals or fragments of crystals throughout the work area and that the work is done entirely by the tool and is not participated in by the crystals themselves. The contrary appears to be the case with the flowed hole where even an old scratched tool will frequently produce faultlessly smooth holes, the reason apparently being that the crystals themselves in their act of fluidic rearrangement, form the superficies of the hole flowed and supply the materials which make up its wall, outer layer or skin as previously referred to.

This discovery or invention may be further demonstrated by causing a number of holes to be flowed in a bar, marking the line of perforation before the work is done with a central scribing mark and transverse scribings to locate each hole. When the test piece is sawed and examined, it will be found that the striations shown on no two holes are similar to each other, and that the striations shown on no hole are similar to the markings on the tool that made the hole. Such an experiment seems to evidence that in cold flowing the crystals are physically the real tools of the work and that the tool 17 used, merely maps out or defines the work area or area of flow.

As might be expected from such conditions it has been found feasible to flow thousands of holes in any ferrous material, where the difference between the diameter of the tool 17 and that of the flowed hole would average .0002" or less so that a working diameter of plug-gauge fineness can instantly be obtained on all holes and the flowed blank or plug made by a single operation can be used as a precision gauge without grinding.

From the above facts it is evident that by cold flowing, certain physical traits and materials can be transmuted. For example, densifications can be accurately made for obtaining, without heat treatment, determinate increases of hardness in materials. Detrusions and extrusions can be readily made which leave the flowed production free from the danger of cracks or other destructive effects. Swagings and cold forgings can be made which give a production of more minute fidelity of design than heretofore possible.

At this point, it may be said that the tool 17 starts to work resting upon the upper surface of the plate 14 and therefore it does not strike a blow and is practically noiseless in operation. The tool follows through the plate 14, pushing the blank out, but performs no work on the metal except to define peripherally, the fluidic area in which the crystalline and molecular flow takes place. The necessary speeds, pressures, and other operative data necessary to produce cold flow are hereinafter referred to in connection with the method of cold flowing herein disclosed. The opening 19 does not form a die or cutting tool, nor should the tool 17 be considered as a punch. The opening 19 is made practically without clearance, in respect to the tool 17. It simply aids the tool in defining the work or fluidic area.

The expression "performs no work" used above means that the tool performs no cutting work.

The action of the tool is to maintain on the portion of material being moved, a pressure constantly equal to the residual resistance, at a rate of motion corresponding to the natural rate of yield of the material. Throughout such motion the work of parting takes place between the fixed and moving portions of the material treated, the tool merely maintaining the requisite pressure and speed.

Tools used for this work are not suitable for use in a punch press or the like as they are not cutting or shearing tools. For a ¾" hole in steel ½" thick the clearance between the tool 17 and the opening 19 is .0005". The blank from the area 18 when it drops from the plate 14 is comparatively cold as distinguished from similar blanks punched from a plate of this size and may be readily caught in the hand. Punched blanks are hot because of the tearing effect of the punching operation. Neither the plate nor the blank is bent or deformed in any way when cold flowing.

Figures 3, 3A:
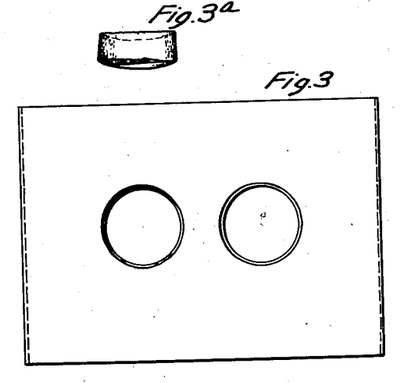
Figure 3 shows a piece of steel having holes punched therein with a very accurate punch and die.
Figure 3a is a side view of the plug punched from the same.
Figure 3B:
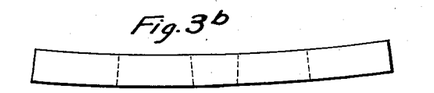
Figure 3b is a side elevation of the piece of steel shown in Figure 3.

Figures 3, 3a and 3b show holes punched on a very accurate punch with a blank from same. The figure shows the typical bulging of the plate by the punch blow.

Figures 4, 4A:
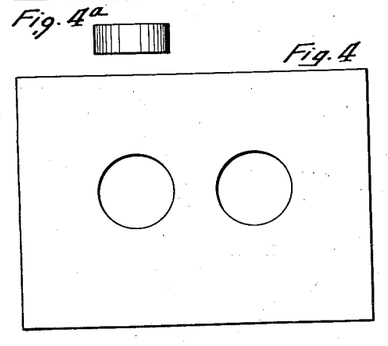
Figure 4 shows a piece of steel with holes flowed therein according to the method herein disclosed.
Figure 4a is a side view of the plug or blank flowed from the piece of steel shown in Figure 4.
Figure 4B:
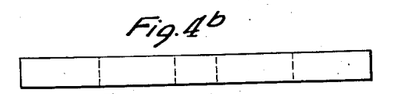
Figure 4b is a side elevation of the piece of steel shown in Figure 4.

Figures 4, 4a and 4b show a plate with holes flowed therein with a blank from same, there being no distortion in the blank or plate.

Figure 5:
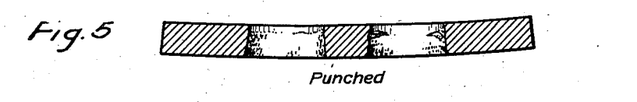
Figure 5 shows cross sections through the punched holes in the steel plate shown in Figure 3.
Figure 5A:
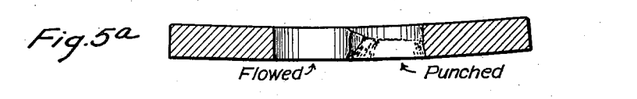
Figure 5a shows a cross section through punched and drilled holes in a single plate.
Figure 5B:
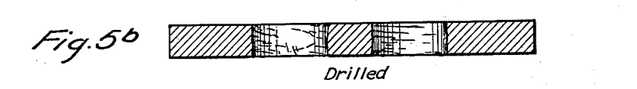
Figure 5b shows a cross section through a pair of drilled holes.
Figure 5C:
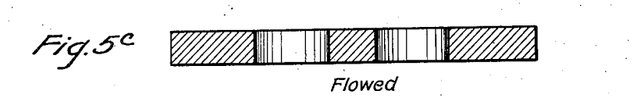
Figure 5c shows a cross section through the flowed holes shown in Figure 4.

Figures 5 and 5c show cross sections through the plates, Figures 3 and 4, Figure 5 being the punched plate, Figure 3, and Figure 5c being the flowed plate, Figure 4, the latter showing that a finished hole results from one instantaneous flowing. Figures 5a and 5b are, respectively a plate having one flowed and one punched hole, and a plate having drilled holes therein.

Figures 3, 3a and 3b, 4, 4a and 4c and 5, 5a, 5b and 5c are reproductions from actual photographs.

Referring to Figure 6, the "work" or "fluidic area" herein referred to may be considered as an annular tubular area 29, 29', extending through the plate 14, the thickness of this area being of the dimension of one crystalline vertical layer of the steel. Figure 6 shows (greatly enlarged) a section of the walls of this work area in order to more clearly describe what is believed takes place at the fractional instant of position of flow, that is to say, when the steel is changing from a condition of elasticity or of crystalline coherence to a condition of plasticity or crystalline fluidity. At this instant, the crystals 20, 21 are driven back into the amorphous material 22 in plate 14 to the line 23 which is the outer boundary of the fluidic area: The crystals 24, 25 are forced to the right, Figure 6, into the amorphous material 26 in the blank from area 18 to the line 27 which is the inner boundary of the fluidic area 29.

It is assumed, although it cannot be demonstrated, that if a crystal 28 lies directly across or with a major portion within the fluidic area, that an actual molecular disruption of the crystal takes place, the molecules of the crystal dividing on a fluidic line, which it is assumed is in the center of the plane of the wall of the fluidic area, the severance of the crystal leaving it as two separate molecular agglomerates; and that such agglomerates shift to the right and left of the line of flow and take their proper places respectively in the superfices of the blank 18 and in the hole in the plate 14.

From the foregoing, it will immediately be apparent that it is impossible by any known scientific method, to clearly define the thickness indicated at 29 of the fluidic wall. Some physicists believe that the probable average thickness of a crystalline layer in a ferrous body is approximately .00001". It should be therefore theoretically possible to flow steel to measurements within this limit if it were possible to construct and work tools in a machine to define the fluidic area with that degree of accuracy. However, it is not possible to construct tools, for example, for a ¾" hole within this degree of accuracy. It has been found, however, upon measuring a ¾" hole produced by the best tools and machine at present obtainable and the blank coming therefrom, that the actual difference between the blank and the hole is .0002" which indicates a thickness of .0001" for the wall 29 of the fluidic layer, from which it will be evident that pieces can be made, by taking advantage of this invention, by a single operation of more accurate dimensions than by any other method except those involving repeated processes.

It will be understood that the width of the wall 29 may, theoretically be that of the thickness of a single vertical row of crystals, as hereinafter more fully pointed out, but that the exact thickness of this wall depends upon a number of variable factors, so cannot be definitely stated except by reference to the resultant product.

Figure 7:
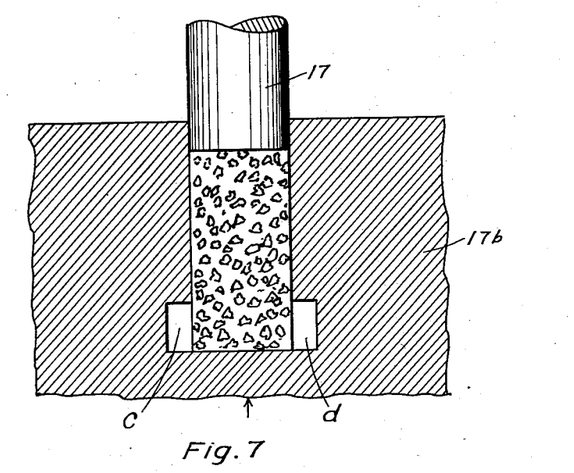
Figures 7 and 8 show steel being cold flowed into recessed rest plates or molds.
Figure 8:
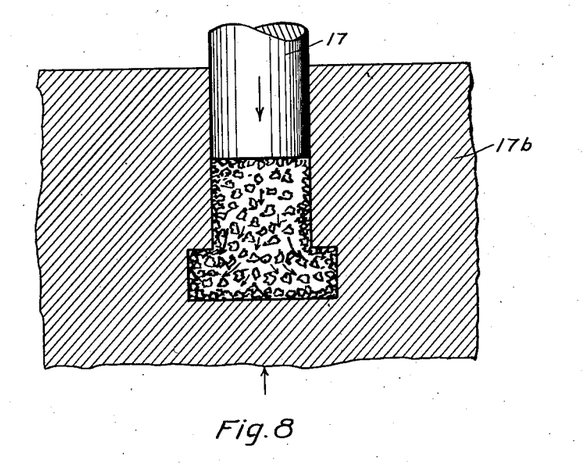

Referring to Figures 7 and 8, in the case of cold flow into recessed rest plates or molds in which flow must occur in directions other than that of the force applied by the tool 17, the action is believed to be as follows, the tool and work being under pre-pressure as before described in connection with Figure 2.

The working force applied to the rest plate 17b prevents the definition of a single flow plane. Consequently, as the elasticity of the material is overcome and the intercrystalline cement suddenly becomes plastic, the change to plasticity occurs not in any such single plane as heretofore described, but throughout substantially the entire mass which thereby assumes a plastic state analogous to that of a body of shot disposed in soft wax. Pressure bearing on such a mass tends to follow the law of liquids and is therefore transmitted in all directions.

The portions of the mass opposite recesses c, d, of the mold having no side resistance to movement, flow into the recesses, moving through a substantially infinite number of internal slip planes dependent for direction and extent on the size and shape of the crystals, the relative amount of the plastic cement, and the size and shape of the rest plate or mold. As the recesses of the mold 17b are completely filled the entire pressure on the mass is transmitted through the crystalline layer in contact with the inner surfaces of the mold, into which layer additional crystals are forced, displacing a portion of the plastic flux and forcing it back into the general mass and giving a resultant hardness and high density to the surface.

The above action produces a boundary or skin containing a relatively large proportion of crystals forced or compacted into the superficial layers by the pressure transmitted through the mass. The product thus presents a strengthened and hardened surface conforming to the internal configuration of the mold, the surface being the same in general as the surface produced by the separation of the plate and blank as referred to in connection with Figure 6.

Figure 9:
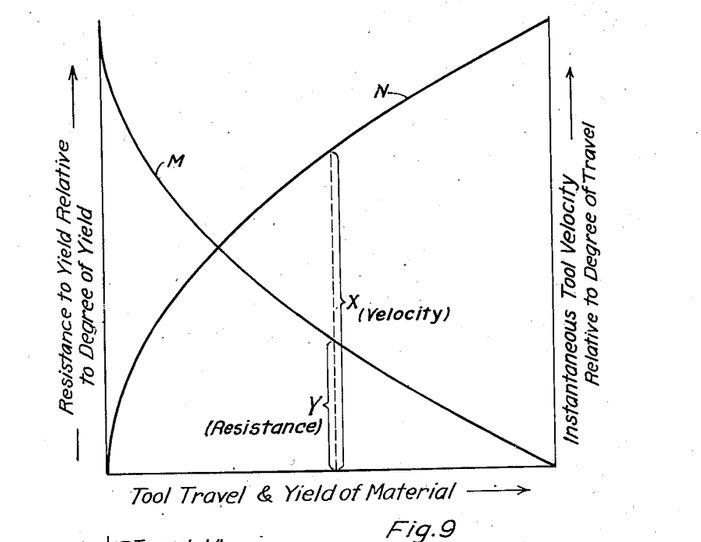
Figures 9 and 10 show curves illustrating how the pressure must be applied to the tool in order to carry out the method herein disclosed.

In flowing round the sharp outlines of the mold, the crystalline structure of the metal is subjected to a flowing action so that the mold acts to define the work area and the effect on the outer layer or skin of the piece is entirely different from that which occurs in ordinary cold forging or the like where the metal is simply driven or pushed into a mold or die, during which operation no attempt is made to apply pressure to the work in accordance with the kinetic curve, Figure 9, hereinafter referred to, where the pressure on the tool 17 decreases with the linear advance of same on the work as it overcomes the respective decrements of lag. In cold flowing in molds, no blow is struck and as the work and machine are under initial pressure as heretofore mentioned, cracking and improper formation and dimensioning of the work is prevented.

At the end of the working stroke of the tool 17, Figure 8, the steel having been flowed to size in the mold 17b, the residual pressure on the walls of the mold is at a minimum, so the life of the mold is much greater than when other methods such as cold forging are employed, where the pressure must be maintained at a maximum in order to insure accurate formation of the piece. This application of cold flow may be said to permit die casting of cold metals as the metal is caused to flow to size with a reduction of pressure occurring throughout the operation and without the use of heat.

When cold flowing as described in connection with Figure 6, it is often possible to use a tool 17 softer than the metal flowed because the pressure is applied over a considerable area by the tool but concentrates in the work or fluidic area. With the conditions shown in Figures 7 and 8 the pressures are differently distributed and tools harder than the work are generally necessary. Here at the end of the working stroke the pressure is not high as the formation of the piece being made is accomplished while same is in a plastic condition, although the initial pressure is relatively great in order to start the flow.

From the foregoing, the phenomena herein described as "cold flow" will be understood. It is a phenomenon hitherto unknown and can be practiced by the method and apparatus herein disclosed and claimed.

A method for producing cold flow, for example in steel, will now be disclosed.

Any suitable mechanism may be used to apply the pre-pressure necessary for fracture-proofing as heretofore referred to, and referring again to Figure 2, it will be observed that when the steel plate 14 is locked between the clamp members that a certain amount of pressure (indicated by the arrows) is transmitted upwardly from the bottom members 15' and 16', and through the plate to the tool 17, which is held in fixed position down against the upper surface of the plate. This upward pressure applied to the tool as aforesaid, is for the purpose of eliminating any free space between the tool and the work and any lost motion in the mechanism used to apply the tool to the work.

The work is therefore locked under compression and like a diaphragm, spans the hole in the rest plate 17' and the tool is resting upon the steel under a preliminary pressure conveniently applied from below, the preliminary pressure being in one machine as an example, on a plate ½" thick of 75,000 T. S. steel, of 15,000 lbs.

The flowing of the metal is now accomplished by a downward pressure of the defining tool 17 which cooperates with the rest plate 17' in the manner previously described to push the blank from area 18 through the area of fluidity which the configuration of the tool and rest plate determines. For example, the tool may take the outer form of a gear wheel provided with peripheral teeth in which event the resultant blank from area 18 will be a finished gear wheel corresponding exactly in dimensions to the tool that made it, but with a flowed surface fineness not limited by the fineness of the tool and rest plate but only by the crystal rearrangement of its superficies.

In the case of a ¾" blank to be made out of ½" thick stock, the fracture-proofing pressure on the upper clamp members 15, 16 would be a total of five tons downwards, and the upward pressure on the clamp members 15', 16' would be a total of seven and a half tons, that is, a total of seven and a half tons is applied upward to the work by lower members 15' and 16', five tons of which pressure is resisted by the fracture proofer or clamp members 15 and 16. The remaining two and a half tons of pressure is resisted by the linkage backing the tool 17. The result is static equilibrium. The flowing or working pressure, that delivered to the tool 17, will be a total of 187,750 pounds at the beginning of the downward movement of the tool.

It will be evident from the foregoing that very great pressures are required in order to produce the phenomenon of cold flow herein described to make practical use of this discovery, and that it is necessary that these pressures be applied not only in a highly efficient manner but so that the pressure on the tool decreases with the linear advance of same through the work as it overcomes the respective decrements of lag; the pressure must be applied at speed inversely proportional to the instantaneous resistance of the substance being worked. This is not only necessary to eliminate any shearing or punching action, but is also necessary in order that the machine applying the pressures will not be distorted and perhaps wrecked by the pressure it applies to the work. Also the mechanism used must advance the tool through or on the work by very fine increments at great pressures without lost motion and with great uniformity of motion.

It is therefore necessary at this point to briefly discuss the apparatus necessary to carry out the method of producing cold flow as herein set forth.

So far as is known, there are no mechanical elements—such as the screw, the lever, etc.—which can replace each other to bring into operation basic physical phenomena such as that of "cold flow" as herein described. Once such a basic physical phenomenon has been observed it cannot be duplicated by any other element than the one that produced it. Non-basic operations such as polishing, grinding, lifting, pushing, etc., differ from basic physical phenomena by the fact that they can be produced by numerous agents acting either singly or in combination.

A suitable apparatus to produce cold flow applies mechanically the mathematical concept known as the "infinite plane" a discussion of which may be found in standard works on mathematics and geometry.

An infinite plane is a plane of indeterminable extent, all of the lines of which lie in the same planar surface.

If a body, having a linear axis coinciding with a line in any infinite plane, and pivotally sustained at one end upon a revoluble transverse axis, also coinciding with a line in said infinite plane, be infinitesimally raised on such revoluble transverse axis out of its absolute coincidence in said infinite plane, the kinetic relationship of such body to such infinite plane is then expressed in the formula:

$$\frac{\cos \theta}{\sin \theta} = \infty$$

That is to say, it approximates theoretic infinity, though infinitesimally finite, assuming $$\theta = 0° \ 0' \ 1''.$$

If two straight bodies, having linear axes coinciding with each other, and both of said axes coinciding with a line in an infinite plane, be mutually joined by a pivot having a transverse axis also coinciding with a line in said plane, and if one end of one body thereof be pivotally supported upon a transverse axis likewise coinciding with a line in said infinite plane, and the opposite end of the other body thereof lying in said plane shall be free to move therein, then, upon infinitesimally raising the mutually-articular transverse axis of such bodies, the one body infinitesimally rotating upon its transverse pivot, and the other body infinitesimally moving in said plane, the kinetic relationship of such composite, mutually-articulate bodies to such plane is expressed in the following formula:

$$\frac{\text{Cos. } \theta}{2 \sin. \theta} = \infty$$

That is to say, the kinetic value of such bodies in relation to such plane is a theoretic approximation of infinity, but actually immensurably finite, assuming $\theta = 0° \ 0' \ 1''$.

This infinite plane apparatus consists of two articulated levers, one of which is anchored and the other free, presents a classical example of a mechanical element and is wholly differentiated from all other single mechanical elements.

The infinite plane has the peculiar trait, separating it from all other known mechanical elements, that in it alone is found a physical embodiment of the infinitely fine functions of the angle itself.

The mathematical expression of an infinite plane as used in this specification signifies the condition of two mutually articulated links, each having a pivot at its outer end parallel to the central articulating pivot, with all pivots lying in a straight line, called the planar axis.

If one end pivot be rotatably anchored and the other end pivot be free to move only in the line of the planar axis, then by retracting the central pin from the planar axis, thus rupturing the infinite plane, the free end pin is pulled toward the anchored pin.

The links thus actuated are pulling or tractor levers, since their sole function is to pull in the free end pin.

It will be seen from the foregoing that a mechanical embodiment of the infinite plane results in a device that gives theoretically infinite pressures and actually finite or measurable pressures and that such a device would give—within the limits of observation—the infinite relationship existing between an angle and its functions in all positions thereof.

By way of illustration, consider the case of a mechanical embodiment of an infinite plane made of two levers, each 24" long, being anchored at one end, and having the opposite end free to move in a guide coincident with the planar axis, so that its levers occupy the straight line, or infinite plane, at their start of operations. Suppose the central articulation is moved 1/64" away from the planar axis; as a result the free end of the infinite plane has approached the fixed anchored end by .0000118", and the levers have each assumed to the planar axis an angularity of 0° 2' 14".

Upon analyzing this apparently simple statement, it is found that the mathematical and physical phenomena involved are quite complex, and that the mere superficial statement of the angle assumed does not even adequately indicate what has taken place. Assume that the mechanical embodiment of the infinite plane has been connected by mechanism so as to work upon some object; the pulling-motion exerted at the end of this 1/64" breaking or stroke of the plane, and amounting to the above .0000118", does not at all indicate the infinitesimal complexity of which it is made up. As a matter of fact, the plane has moved through 134 seconds to arrive at the above angle, which means that during each of those seconds the free end has only approached the anchored end by .00000009", or by a motion very much less than the known thickness of a crystalline layer of any probable substance that could be worked upon, such as steel or brass, etc.

This phenomenon can be analyzed in its practical aspects, first as to its implications of pressure, and second as to its significance in pure motion.

By the well-known formula, $$\frac{\text{Cosine } \theta}{2 \sin \theta} = \text{K. E.}$$

the kinetic efficiency, or proportion of pressure delivered by the mechanical embodiment of the infinite plane as related to the pressure imparted to the infinite plane gives under conditions as above $$\frac{23.999988''}{.015625''} = 1537 \ \text{K. E.}$$

Therefore, if a pressure of one ton is applied to pull the articulation away 1/64", the free end of the tractor lever approaches the anchored end of the tractor lever with a pressure of 3,074,000 lbs. Obviously, in an ordinary machine many tons would be applied, so that it is now evident that the pressure developed at this stage of the motion breaking the tractor levers is relatively limitless, or technically "infinite".

In striking contrast to the above pressure aspect, stands the motion aspect. The mensurable thickness of the strata of ordinary commercial materials, representing crystalline layers one crystal deep, might be fairly expressed, according to the metals used, as being from .00001" to .000015", so that the motion per second of angular-travel of the plane is only 1/167th of the actual average thickness of the crystalline strata of bodies making up materials in common use. The significance of this fact is that while the plane is practically infinite in power, it is so infinitesimal in the gentleness of its minute increments of motion, that its approach to a given resistance-duty transcends the perfection of any other conceivable mechanical agent in all the realm of nature,—a trait well implied by its name, the "infinite plane".

Amongst all known mechanical agents, the mechanical equivalent of the infinite plane alone functions to bring into play ratios from literal infinity to finite values in a single physical object. By its very nature, it can never operate except as a pulling effort, hence such physical object, in all classes of machinery where the infinite plane can be used, is called a tractor-lever, i. e., a pulling-lever. The infinitesimality of the efforts of these pulling-levers is the source of their successful relation to the resistance of the crystalline structure of any material worked upon, and this infinitesimality is directly due to the effect of the minute gradations of the functions of the angle itself being translated into the functions of the tractor-levers.

For example, between the infinity of the tractor-lever's straight-line and the position of 0° 2′ 14″ in the above cited example, the functional increment of increase in the pulling (or versed sine) of the lever is .0000002 per second of angular-travel. This functional increment is also the actual increment, there being no lost motion. Such a gradation of advance, with such infinitesimal increments, is possible only to the tractor-lever in all mechanical nature.

These ultrascopic increments must be made mechanical realities and in a machine embodying the infinite plane tractor-levers, provision must be made for an automatic pretensioning of the tractor-levers with great force upon the work (as heretofore referred to) before the bending of the plane brings the infinite pressure into action. This means that there must not be any lost motion in the machine so that the actual work upon the material is the same as the theoretic mathematical gradations of motion and of pressure described. The effect of this is that, for the first time, pressure is now so related in the infinite plane to resistance that the limit of elasticity, or of stratified crystalline resistance of any substance, is passed so gently that flow or displacement, as the case may be, results without shock and without tear, or any of the destructive phenomena hitherto produced.

Obviously, no machine such as a hydraulic or mechanical punch press as now known can be used to duplicate the results obtained by a machine operating on the principles above described, for as previously stated as far as modern scientists know, nature has no duplicates in the means by which it is possible to bring into operation basic physical phenomena such as that described in connection with the use of the infinite plane mechanism. The best and only approximation that can be made to the results obtained by the infinite plane is restricted to mechanical combinations which can produce the uniform pressure continuously of the same intensity as the maximum effort exerted by an infinite plane at its first tangible degree of motion but this gives no duplication of the effects of the infinite plane since the very uniformity of such a pressure destroys the characteristic falling intensity of the pressure of the infinite plane so that the infinitesimal regulation of pressure as the infinitesimal decrease of resistance is passed, is wholly absent from any device whether mechanical, fluid, or gaseous which may be combined in a mechanism for the purpose of imitating this result.

For example, in connection with hydraulic devices, in order to produce an infinitesimal falling away of hydraulic pressure from a supreme initial intensity to a low final intensity, special valves controlled by screw devices, timed accurately to plunger transits; other devices controlled by pneumatic pressure, regulated to fine reductions by cam control; and other devices by steam compression regulated to be reduced by valvular-aperture control; and other devices by electrical control for reducing valvular apertures upon such hydraulic devices have been tried and fail to produce a curve as shown in Figure 9 approximating a perfect falling parabolic curve corresponding to the infinitesimal reduction of pressure to work.

In studying experimentally the behavior of cemented crystalline bodies when stressed beyond their elastic limits, it has been determined that in such bodies the characteristic relation between resistance and yield through a continuous transit, when expressed graphically, assumes the form of a falling parabola. Such a parabola is illustrated by curve M, Figure 9.

In any mechanical linkage, the velocity ratio is the inverse of the kinetic efficiency or pressure ratio. By assuming, therefore, the possibility of a pressure applying mechanism having velocity characteristics varying in a parabolic relationship exactly the inverse of curve M, as illustrated by curve N, Figure 9, the phenomenon of cold flow was visualized.

By combined theoretical and empirical methods involving approximately 35,000 different sets of calculations a single and definite combination and proportion of tractor levers and related parts were evolved, which functioning within a definite limit of angular departure from the infinite plane, namely 29° 59′ exactly maintained the above desired relationship. The parabola N therefore represents the characteristic curve of the evolved mechanism. The physical carrying out of the inverse parabolic relationship produced cold flow.

Figure 10:
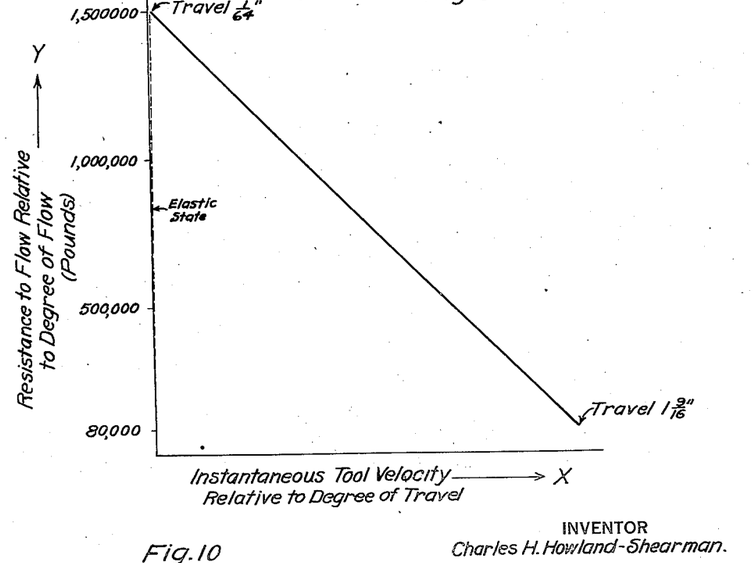

Figure 10 in which the ordinates of curve N are plotted horizontally against corresponding ordinates of curve M plotted vertically, illustrates directly the inverse relationship occurring between these ordinates during the flow, for example, from an instantaneous pressure point of 1,500,000 lbs. at which point the tractor lever mechanism has produced plasticity in a work piece at the end of 1/64″ tool travel, and a pressure point of 80,000 lbs. occurring at the end of $1\tfrac{1}{16}$″ tool travel. The physical interpretation of this figure is simply that as the tool pressure produces a characteristic yield of the material the tool movement is precisely sufficient to take up the yield as it occurs. The material is thus worked exactly along its own natural characteristic curve, without slack or overrun, either of which would cause interruption and destruction of the flow. It is due to this exact adherence to the natural curve that cold flow occurs smoothly, without shock or noise. Conversely the smoothness and silence of cold flow furnish strong physical proof of the accuracy of the described essential relationship in the operating mechanism.

Theoretically, the total drop-off of a curve such as Figure 10 should be from the high point of 1,500,000 lbs. to 0 lbs. Practically, it is not found feasible to obtain so great a decrement and the slight difference of 80,000 lbs. shown on the actual curve represents a relative loss of efficiency in the machine producing these pressures of $$\frac{80,000}{1,500,000} = 5.3\%$$

which represents a much lower loss of efficiency than is normally present in machine tools in which high efficiency is necessary, because of the large amount of power necessary with a machine of any other type than that operating on the infinite plane principle.

It is necessary at this point to consider the mathematical philosophy involved in machines utilizing the infinite plane tractor-lever principle, reference being had to the following definitions:

K. E.=kinetic efficiency=proportion of the pressure delivered by, to the pressure imparted to, any member or group of members.

K. R.=kinematic ratio=proportion of the motion delivered by, to the motion imparted to, any member or group of members.

Combined K. E.=two or more K. E.'s of a group, successively multiplied together.

FORMULÆ

*Kinetic efficiency formula (for solution of all tractor-lever positions)*

$$\frac{\text{Cosine } \theta}{2 \text{ sine } \theta} = \text{kinetic efficiency}$$

*Conversion formulæ*

$$\frac{1}{\text{Kinetic efficiency}} = \text{kinematic ratio (K. R.)}$$

$$\frac{1}{\text{Kinematic ratio}} = \text{kinetic efficiency (K. E.)}$$

The foregoing formulæ are used as the basis for computing the angularities, settings, versed sine deliveries, kinetic efficiencies and kinematic ratios of infinite plane tractor-levers and mechanisms embodying the same.

Using the above formulæ, the necessary machine may be devised to obtain supreme pressures at the start of the working resistance and to diminish these pressures in an approximately perfect parabolic curve as represented by the intersection of the ordinates of pressure with the ordinates of advance of the tool 17 of the machine.

Figure 11:
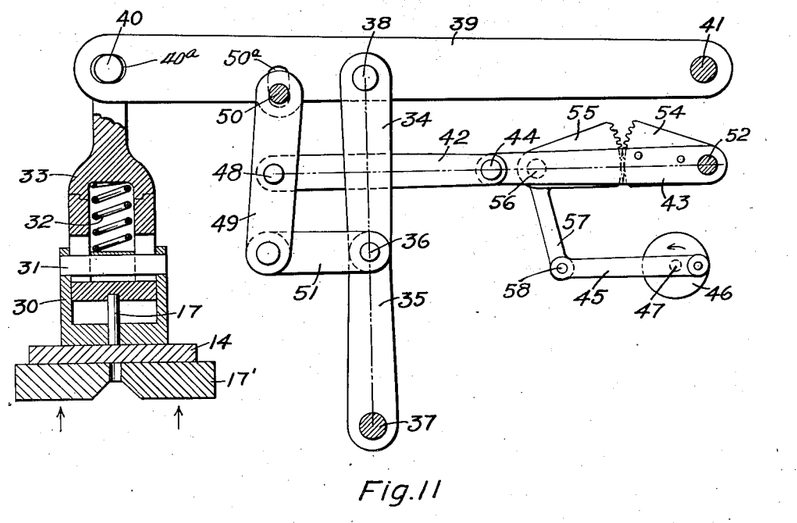
Figure 11 is a diagrammatic representation of the machine in the "at rest" position, suitable for practicing the method herein disclosed.
Figure 12:
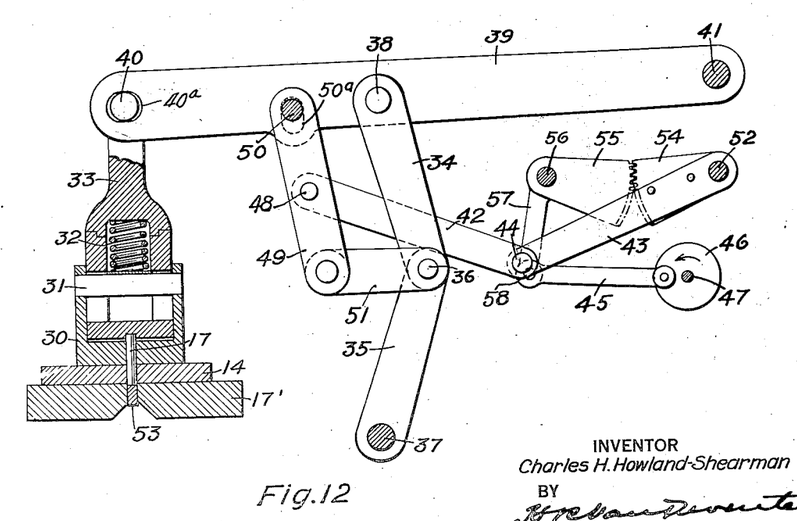
Figure 12 is the machine shown in Figure 11 at the end of a working stroke.

A description of a machine suitable for practicing the method herein claimed follows, it being understood that the details of construction are immaterial and that the accompanying Figures 11 and 12 are purely diagrammatic and merely illustrate the fundamentals of a machine embodying tractor levers necessary to carry out the method. In these figures, the movements are exaggerated for the sake of clarity.

Referring to Figure 11 where the machine is in the "at rest" position, the initial or fracture proofing pressure is applied by clamping the work 14 between the fracture proofer 30 which combines in one member the clamps 15, 15', 16, 16', Figure 6. The rest plate 17' is pushed upwardly in the direction of the arrows by any suitable mechanism and held fixed in relation to the framework of the machine and the pins 37, 41, 52 hereafter referred to. The pressure for the fracture proofer 30 is determined by the cross member 31 having a spring 32 bearing downwardly thereon, the same being held in the ram 33. When the ram which carries the tool 17 is brought downward on the work 14 the spring 32 being interposed between the ram and the fracture proofer, yields, but transmits to the work 14 a pressure determined by the strength or setting of the spring.

For the sake of simplicity, the supporting frame and the members necessary to keep the tool 17 vertical and to guide it and the fracture proofer during operation are not shown as these parts may be of any suitable construction.

The primary tractor levers of the machine are the levers 34, 35 which are movably joined or articulated at their mid point by a suitable pin 36. The lower lever 35 is supported on a pin 37 fixed to the framework of the machine and the upper end of lever 34 turns on a pin 38 fixed to and movable with the tool beam 39.

The tool beam or delivery member 39 at its outer or working end has a pin 40 to which is connected to the upper end of the ram 33 and at its rear end the beam is fulcrumed on a pin 41 fixed in the framework of the machine.

The secondary tractor levers are indicated by the numerals 42, 43, articulated on pin 44. Secured to the lever 43 is a gear segment 54 meshing with a second segment 55 fulcrumed on a fixed pin 56 and having a downwardly extending lever 57. The lever 57 supports a wrist pin 58 which is linked by a connecting rod 45 with a suitable crank device such as the crank plate 46 driven by a power shaft 47. The outer end of lever 42 turns on a pin 48 mounted in a lever 49, which turns on a stationary pivot 50 secured to the supporting part of the machine, a clearance slot 50a for pivot 50 being provided in tool beam 39. Lever 42 is connected by a link 51 with the pin 36. The rear end of lever 43 is fulcrumed on a pin 52 fixed in the framework of the machine.

The pin 40 is provided with horizontal clearance 40a in the ram 39 to allow for the slight end motion of the latter due to its swing around the pin 41.

At the beginning of a working stroke, pressure by any suitable means is applied upward on the rest 17' and the work 14 is clamped between the fracture proofer 30 and the rest plate 17' and is under a preoperative pressure as heretofore referred to.

The work is also pressed against the tool 17 resting on the upper surface thereof, which pressure is transmitted to the entire system of levers thereby eliminating lost motion and placing them in a position that satisfies the mathematical requirements for an infinite plane mechanism.

Power being applied to the shaft 47 and the crank disk 46 being thereby revolved in the direction of the arrow, the machine proceeds through the working stroke, that is to say, the tool 17 passes through the work 14 pushing out the blank 53. As the ram comes down on the work the prepressure applied by the fracture proofer 30 naturally increases due to the additional compression of the spring 32 and at the same time the primary and secondary tractor levers and the tool beam and tool assume the positions shown in Figure 12 at the end of the working stroke and thereby fulfill the mathematical requirements necessary to translate and apply the tractor lever force through the tool beam in order to give it a practical amplitude and to deliver the force of the levers outside of the line of the tractor levers themselves, this being the force delivered to the tool 17.

To clarify the analysis of the mathematical elements involved in a machine such as shown in Figures 11 and 12, two typical groups of triangulations will be referred to:

First, the position of the primary tractor levers 34, 35 at the end of a 1/64" tool stroke, and the corresponding position of the secondary tractor levers 42, 43 at the end of the same 1/64" stroke.

Second, the position of the primary tractor levers at the end of the maximum or discharge stroke of the machine which may be taken as 1 9/16" with the corresponding position of the secondary tractor levers at the same 1 9/16" stroke.

By also calculating the kinetic efficiencies of the respective sets of tractor levers, at the two positions individually as well as their combined kinetic efficiencies, the extremes of efficiencies corresponding to the extremes of operation can be determined.

PRIMARY TRACTOR LEVERS

*Ang. and K. E. at end of 1/64" tool stroke*

Complete stroke of ram = .015625"
Kinematic ratio of tool beam = 1.5
Double D. vers. primary tractor-lever = $\frac{.015625''}{1.5}$ = .010417"
Reqd. D. vers. primary tractor-lever = $\frac{.010417''}{2}$ = .0052085"
Radius of primary tractor levers = 19.125"

In these calculations the following abbreviations are used:
D. = dimensional
Vers. = versed sine
Cho. = chord
Sin. = sine
Cos. = cosine
Rad. = radius
K. E. = kinetic efficiency or mechanical advantage
K. R. = kinematic ratio or velocity ratio
Ang. = angle $\frac{D. vers.}{Rad.}$ $\frac{.0052085''}{19.125''}$ = .0002671, taken at .0002671 = vers. 1° 19' 27" (error 0)

Cho. 1° 19' 27" = .0231106 × 19⅛" = .441990" = D. cho.

Sin. 1° 19' 27" = .0231090 × 19⅛" = .441960" = D. sin.

Cos. 1° 19' 27" = .9997329 × 19⅛" = 19.119892" = D. cos.

2 Sin. = .44196 × 2 = .88392

$\frac{D. cos.}{2 Sin.}$ $\frac{19.119892}{.88372}$ = 21.630794 = K. E. of primary tractor levers at end of 1/64" tool stroke

SECONDARY TRACTOR-LEVERS

*Ang. and K. E. at end of 1/64" tool stroke*

D. cho. primary at end of 1/64" tool stroke = .44199"

Kinematic ratio of tool beam = 2.

Reqd. D. vers. secondary = $\frac{.44199''}{2}$ ÷ 2 = .110498"

Rad. of secondary tractor-levers = 25.875"

$\frac{D. vers.}{Rad.}$ $\frac{.110498''}{25.875''}$ = .0042686, taken at .0042686 = vers. 5° 17' 45" (error 0)

Cho. 5° 17' 45" = .0923968 × 25⅞" = 2.390767" = D. cho.

Sin. 5° 17' 45" = .0923465 × 25⅞" = 2.389466" = D. sin.

Cos. 5° 17' 45" = .9957314 × 25⅞" = 25.764550" = D. cos.

2 Sin. = 2.389466 × 2 = 4.778932

$\frac{D. cos.}{2 Sin.}$ $\frac{25.76455}{4.778932}$ = 5.391278 = K. E. of secondary tractor-levers at end of 1/64" tool stroke $\frac{5.391278}{2}$ = 2.695639 combined K. E. secondary and tractor beam 21.630794 × 2.695639 = 58.308065 = combined K. E. of primary and secondary tractor-levers and tractor beam, at end of 1/64" tool stroke.

From the foregoing mathematical analysis, the following will be evident.

First, that between the extremes of these two efficiencies there are actual infinite series of graduations of kinetic efficiencies, kinematic ratios and corresponding motion-pressure increments which are found in the intermedite transit between the extremes given, between the minimum or initial and maximum conditions.

Second, that if the secondary tractor lever is actuated, for example, by a motor, a speed reducer and a crank mechanism, that in the initial position above computed stupendous and substantially resistless pressures can be readily developed from a very small motor actuation, for example, in connection with a practical machine, a 10 H. P. motor produces pressure far in excess of what would be developed with a motor 15 times as large using other forms of mechanical elements, such as gear-trains and the like.

By triangulating the intermediate stages of the progress of a tool 17 driven by the primary tractor lever between 1/64" and 1.5625" say in 1/32" increments of motion and corresponding increments of kinetic efficiency, it will be found that the decrements of pressure precisely correspond to the decrements of resistance in the material being worked, and that the relativity of the elements of each pair of accelerating motion-increments is exactly inverse to the relativity of the elements of the corresponding pair of pressure-decrements.

Summarizing the mathematical philosophy of the foregoing, it has been found that there is no actual infinite kinetic efficiency in the series; that starting with the minimum kinetic efficiency representing a finite value of the initial pair, at departure from the initial angle and ending with the minimum kinetic efficiency of the final pair whose limit is the final angle, there are a series of decrements of pressure precisely corresponding to the decrements of resistance presented by the work being done, and that the ratio between the elements of each pair of accelerating motion increments is precisely inverse to the relativity of the corresponding pair of pressure-decrements.

This process may be used to produce in a single operation a large number of objects that heretofore required several operations for their completion,—for example, gears, clock parts, chain links, key blanks, silverware, watch cases and other parts requiring a high degree of accuracy in their formation and a high degree of finish on some or all of their surfaces. The latter has required grinding and other operations which can be dispensed with when the objects are made by this process.

The phenomena of cold flow as described herein is so closely associated with the method for producing the same and the apparatus necessary in order to carry out the method, that the phenomena constituting a discovery, the invention and the apparatus necessary to practice same have been disclosed together. It should be understood, however, that the disclosure of the apparatus herein made is for the sole purpose of clearly setting forth how the method herein disclosed should be performed, and that such apparatus forms the subject matter of other applications for patent thereon.

What is claimed is:

1. The method of working normally elastic substances to change the physical position, mutual relationship and traits of the crystalline molecular structure thereof to produce cold flow in said substance which consists in applying pressure to the substance to cause a pressure transit through a predetermined area of the substance whereby said material is rendered plastic in said area and removing the portion of said substance defined by said area by continued application of said pressure, said pressure being applied at speed increasing in direct proportion to the decrease of resistance of said substance to yield.

2. The method of forming smooth surfaces on substances comprising crystalline aggregates and amorphous material which consists in submitting the substance to a compressive pressure of sufficient intensity to cause the crystalline aggregates to flow through the amorphous material in timed relation to the flow of pressure through the material.

3. The method of cold flowing a substance which consists of mechanically defining an area therein in which it is desired to produce a change of position in the constituents of the structure, and applying to said area a pressure corresponding to the natural resistance of said substance to said change of position proportionate to the degree of said change.

4. The method of separating a crystalline body by cold flowing along a cleavage plane which comprises applying pressure along said plane at speed varying in inverse proportion to the change of resistance of said body to separation along said plane.

5. The process which comprises deforming a crystalline body by rearranging a surface of the crystalline structure which consists in causing a part thereof to flow to form a structure of modified configuration, the flow taking place under a pressure varying inversely to the resistance to said flow.

6. The process which comprises deforming a body of metal containing crystals by rearranging molecules thereof in non-crystalline form which consists of causing a part thereof to flow to form a structure of modified configuration, the flow taking place under a pressure varying inversely to the resistance to said flow.

7. The method of working a substance which consists of holding the substance under pressure and then submitting a part of the material to additional pressure changing in correspondence to the change in natural resistance of the work being done referred to the degree of said work.

8. The method of working a substance which consists of submitting an area of said substance to pre-operative pressure, defining an area of fluidity within said body, producing fluidity within said second area by applying pressure to the substance within said second area, said second pressure varying in correspondence to the natural variation of resistance of the work being done referred to the progress of said work.

9. The process of cold flowing substances which consists of applying to the substance pressures which when graphically represented fall on a curve passing through a succession of intersections between abscissæ, said abscissæ representing the instantaneous totalities of flow and ordinates representing the corresponding instantaneous pressures.

10. The herein described method of producing metal objects which consists of subjecting a metal body to a preoperative pressure in order to define a work area within the metal and removing the object from within said area while said body is held under said pressure, by applying pressure to said object at speed varying in inverse proportion to the change of resistance of said object to removal from the metal body.

11. The herein described method of producing metal objects which consists of subjecting a body of metal to a preoperative pressure, defining a work area within said body, subjecting said body to a working pressure sufficient to cause cold flow therein, said last pressure being applied at speed varying in inverse proportion to the change of resistance of said body to flow.

12. That method of working a material which comprises supporting said material, applying an initial pressure through said material, resisting said pressure whereby an infinite plane condition is mechanically produced, rupturing said infinite plane condition and overcoming said initial pressure by a pressure produced by said rupture of said infinite plane condition.

13. That method of working a material which comprises supporting said material, applying an initial pressure through said material, resisting said pressure whereby an infinite plane condition is mechanically produced, rupturing said infinite plane condition, and overcoming said initial pressure by a pressure produced by said rupture of said infinite plane condition, said second pressure being applied to a predetermined portion of said material.

14. That method of working a material which comprises supporting said material, applying an initial pressure through said material, resisting said pressure whereby an infinite plane condition is mechanically produced, rupturing said infinite plane condition, and overcoming said initial pressure by a pressure produced by said rupture of said infinite plane condition, said second pressure being applied to a predetermined portion of said material outside the line of said infinite plane condition.

15. That method of working a material which comprises supporting said material, applying an initial pressure through said material, resisting said pressure whereby an infinite plane condition is mechanically produced, rupturing said infinite plane condition, and overcoming said initial pressure by a pressure produced by said rupture of said infinite plane condition, the maximum angularity of said rupture lying within a limit of 29° 59'.

16. That method of working a material which comprises supporting said material, applying an initial force to said material, rigidly opposing a part of said force through a predetermined area of said material, resiliently opposing the remainder of said force, and overcoming said rigidly opposed part by applying an opposite force to said predetermined area.

17. That method of working a material which comprises applying an initial force to said material, rigidly opposing a part of said force through a predetermined area of said material by formation of a mechanically produced infinite plane condition beyond said area, resiliently opposing the remainder of said force, and overcoming said rigidly opposed part by rupturing said infinite plane condition.

18. That method of working a material which comprises applying an initial force to said material, rigidly opposing a part of said force through a predetermined area of said material by formation of a mechanically produced infinite plane condition beyond said area, resiliently opposing the remainder of said force, and overcoming said rigidly opposed part by rupturing said infinite plane condition, the maximum angularity of rupture lying within a limit of 29° 59'.

19. That method of working a material which comprises applying an initial force to said material, rigidly opposing a part of said force through a predetermined area of said material, resiliently opposing the remainder of said force, and overcoming said rigidly opposed part by applying an opposite force applied at speed varying in timed relation to the change of resistance to yield of said material.

20. That method of working a material which comprises applying an initial force to one side of said material, establishing a mechanically produced infinite plane condition on the opposite side of said material, and applying a working force to said material by forcibly rupturing said infinite plane condition.

21. That method of working a material which comprises applying an initial force to one side of said material, establishing a mechanically produced infinite plane condition on the opposite side of said material, and applying a working force to said material by forcibly rupturing said infinite plane condition, the maximum angularity of rupture of said plane lying within a limit of 29° 59'.

22. That method of working a material which comprises supporting said material and applying two oppositely directed unequal forces to said material, the greater of said forces being applied to a portion of the material at speed varying in timed relationship to the change of resistance to yield of said material.

23. The method of producing cold flow in a closely defined area of a material which comprises forcibly causing molecular flow in said area at a speed changing in inverse proportion to the change in resistance of the material in said area to yield.

CHARLES H. HOWLAND-SHEARMAN.